United States Patent [19]

Kyogoku et al.

[11] Patent Number: 5,001,408
[45] Date of Patent: Mar. 19, 1991

[54] CONTROL DEVICE FOR INDEXING ROTOR ON BALANCING MACHINE

[75] Inventors: Yoshiaki Kyogoku; Katsumi Ajiyama, both of Osaka, Japan

[73] Assignee: Nagahama Seisakusho Ltd., Osaka, Japan

[21] Appl. No.: 472,759

[22] Filed: Jan. 31, 1990

[30] Foreign Application Priority Data

Feb. 13, 1989 [JP] Japan ................................. 1-34277

[51] Int. Cl.⁵ .............................................. G01M 1/18
[52] U.S. Cl. ..................................... 318/364; 73/467
[58] Field of Search ............... 73/462, 460, 467, 468, 73/471, 475, 487, 464; 364/508, 551.01, 550; 318/612, 364, 366, 369, 264, 258, 265; 324/158 MG

[56] References Cited

U.S. PATENT DOCUMENTS

| | | | |
|---|---|---|---|
| 3,854,339 | 12/1974 | Müller | 73/464 X |
| 3,861,025 | 1/1975 | Sims | 324/158 MG |
| 4,046,017 | 9/1977 | Hill | 73/462 |
| 4,109,312 | 8/1978 | Beutel | 73/462 X |
| 4,419,894 | 12/1983 | Matumoto | 73/462 |
| 4,464,934 | 8/1984 | Giers | 73/462 |
| 4,510,809 | 4/1985 | Fillion | 73/462 X |
| 4,741,210 | 5/1988 | Maus | 364/508 X |

*Primary Examiner*—William M. Shoop, Jr.
*Assistant Examiner*—A. Jonathan Wysocki
*Attorney, Agent, or Firm*—Connolly and Hutz

[57] ABSTRACT

A control device is associated with a dynamic balancing machine for indexing a rotor being examined for unbalance. The control device determines the angular position of unbalance of the rotor during an unbalance measurement run and stops the rotation of the rotor while bringing it to a stop at an angular position related to the determined angular position of unbalance.

2 Claims, 5 Drawing Sheets

CONTROL DEVICE FOR INDEXING ROTOR ON BALANCING MACHINE

BACKGROUND OF THE INVENTION

The present invention relates to a control device by which a rotor being examined for unbalance on a dynamic balancing machine is indexed to a desired angular position after the detection of unbalance.

Stop control devices of this kind have been proposed in various publications. For example, Japanese Patent Examined Publication No. 45-24274 describes an automatic positioning device wherein the motor of a dynamic balancing machine is controlled by pulse signals developed by a photocell and pulse signals caused by unbalance vibration. When the angular position of unbalance has been detected, the rotor is positioned in a definite angular position.

This apparatus requires a low-speed motor for use in stopping the rotor in a prescribed angular position in addition to a high-speed motor for use in measuring the unbalance of the rotor. The provision of these two motors makes it indispensable to provide a clutch, etc., which leads to a complication of the construction. In addition, when the rotor is to be stopped, a switchover from the high-speed motor to the low-speed motor must be made so that the rotor may be subjected to low-speed revolution. Consequently, it takes time for the rotor to be stopped in a prescribed angular position.

Japanese Patent Examined Publication No. 62-39890 also describes an automatic positioning device wherein the counting of angle signals is initiated by the trigger action of a revolution signal developed after the start of deceleration control of the rotor. When the prescribed number of angle signals has been counted, the driving motor is stopped so as to automatically position the rotor in a prescribed angular position.

In this particular apparatus, the counting of angle signals is initiated by the trigger action of a revolution signal developed after the start of the deceleration control of the rotor. However, it is difficult to correctly produce the revolution signal after the start of deceleration control of the rotor, because the rotor no longer revolves at a prescribed measurement speed. Consequently, errors in stop position often occur.

Japanese Patent Unexamined Publication No. 62-127638 also describes a method and an apparatus for positioning a rotor in a balancing machine. However, this reference only describes a technical proposal for the improvement of accuracy in positioning the rotor and does not discuss a technical method or construction for reducing the time interval from the instant the rotor ceases to revolve at a measurement speed until the instant the rotor stops.

SUMMARY OF THE INVENTION

Accordingly, it is an object of the present invention to provide a stop control device for efficiently and accurately stopping a rotor examined for unbalance in a prescribed angular position immediately after the measurement of unbalance.

A stop control device in accordance with the present invention is designed for use in a dynamic balancing machine in which a pulse is produced every time the rotor is rotated by a very small prescribed angle. The minimum number of pulses is found by adding the number of pulses which is correlated with the angular position of unbalance of the rotor to the number of pulses which are produced during the period between the moment when the revolution speed of the rotor begins to decrease from the measurement speed and the moment when the revolution of the rotor is stopped. The stop control over the rotor is effected with the aid of the above-mentioned minimum number of pulses.

Another stop control device in accordance with the present invention is designed for use in a dynamic balancing machine in which the rotor revolves at a measurement speed while being subjected to the detection of unbalance. In this case, the stop control comprises: (1) a reference signal generating device for generating a reference signal every time the rotor makes one revolution; (2) a revolution signal generating device for generating a revolution signal every time the rotor rotates a very small prescribed angle; (3) a memory device for storing the number ($P_b$) of revolution signals produced by the revolution signal generating device in a minimal time interval between the moment when the revolution speed of the rotor begins to decrease from the measurement speed and the moment when the revolution of the rotor is stopped; (4) a first calculating device in which the angular position of unbalance of the rotor is calculated in terms of the number ($P_m$) of revolution signals produced by the revolution signal generating device in the time interval between the moment when the reference signal is produced by the reference signal generating device and the moment when the angular position of unbalance is detected during the time when the rotor revolves at the measurement speed; (5) a second calculating device in which arithmetic operations are performed to obtain the minimal number ($P_i$) of revolution signals necessary for allowing the angular position of unbalance of the rotor to agree with a predetermined angular position in which the rotor is to be stopped, the arithmetic operations being performed on the basis of the number ($P_b$) of revolution signals stored in the memory device, the number ($P_m$) of revolution signals calculated in the first calculating device, and the number ($P_e$) of revolution signals produced during the time the rotor makes one revolution; and (6) a braking device for allowing the revolution speed of the rotor to begin to decrease from the measurement speed in response to a reference signal produced by the reference signal generating device when the minimal number ($P_i$) of revolution signals has been obtained in the second calculating device and for stopping the revolution of the rotor at the moment when the number of revolution signals produced by the revolution signal generating device agrees with the minimal number ($P_i$) of revolution signals.

Still another stop control in accordance with the present invention is likewise designed for use in a dynamic balancing machine in which the rotor revolves at a measurement speed while being subjected to the detection of unbalance. This stop control comprises: (1) a reference signal generating device for generating a reference signal every time the rotor makes one revolution; (2) a revolution signal generating device for generating a revolution signal every time the rotor rotates by a very small prescribed angle; (3) a memory device for storing the number ($P_b$) of revolution signals produced by the revolution signal generating device in a minimal time interval between the moment when the revolution speed of the rotor begins to decrease from the measurement speed and the moment when the revolution of the rotor is stopped; (4) a first calculating device in which the angular position of unbalance of the rotor is calculated in terms of the number ($P_m$) of revolution signals produced by the revolution signal generating device in the time interval between the moment when the reference signal is produced by the reference signal generating device and the moment when the angular position of unbalance is detected during the time when the rotor revolves at the measurement speed; (5) a second calculating device in which arithmetic operations are performed to obtain the minimal number ($P_i$) of revolution signals necessary for allowing the angular position of unbalance of the rotor to agree with a predetermined angular position in which the rotor is to be stopped, the arithmetic operations being performed on the basis of the number ($P_b$) of revolution signals stored in the memory device, the number ($P_m$) of revolution signals calculated in the first calculating device, and the number ($P_e$) of revolution signals produced during the time when the rotor makes on revolution; and (6) a braking means for allowing the rotor to be delayed in beginning to undergo braking power with delay time corresponding to the time interval between a first moment when a reference signal is produced during the time when the rotor is revolving at a measurement speed and a second moment when the number of revolution signals developed after the first moment amounts to $P_i - P_b$, and for stopping the revolution of the rotor at a third moment when the number of revolution signals produced by the revolution signal generating device after the first moment amounts to $P_i$.

In accordance with the present invention, one can effectively utilize the time interval between the moment when the revolution speed of the rotor begins to decrease from the measurement speed and the moment when the revolution of the rotor is stopped. Thus the rotor examined for unbalance can be stopped in a short time at a desired angular position.

In the first calculating device of the present invention, the angular position of unbalance of the rotor is calculated in terms of the number ($P_m$) of revolution signals produced by the revolution signal generating device in the time interval between the moment when the reference signal is produced by the reference signal generating device and the moment when the angular position of unbalance is detected. In the second calculating device, arithmetic operations are performed to obtain the minimal number ($P_i$) of revolution signals necessary for allowing the rotor, which is revolving at a measurement speed, to stop at a prescribed angular position. The arithmetic operations are performed on the basis of the above-mentioned number ($P_m$), the number ($P_b$) of revolution signals produced in a time interval between the moment when the revolution speed of the rotor begins to decrease from the measurement speed and the moment when the revolution of the rotor is stopped, and the number ($P_e$) of revolution signals produced during the time when the rotor makes one revolution. Thus the rotor can be stopped in a shortest time at a prescribed angular position, because the rotor comes to a stop when the minimal number ($P_i$) of revolution signals is reached in the second calculating device.

The angular position at which the rotor is to be stopped may be changed either by changing the damping force of the braking device or by changing the timing of the start of brake action with the damping force kept constant.

BRIEF DESCRIPTION OF THE DRAWING

Novel features and advantages of the present invention in addition to those noted above will become apparent to those of ordinary skill in the art from a reading of the following detailed description in conjunction with the accompanying drawing wherein similar reference characters refer to similar parts and in which.

DETAILED DESCRIPTION OF THE INVENTION

Figure 1:
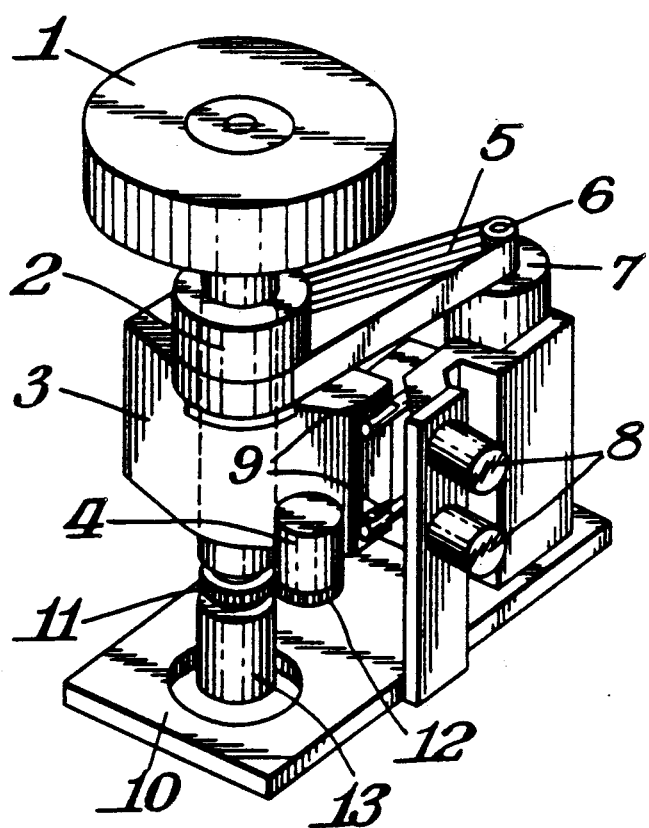
FIG. 1 is a perspective view of a vertical dynamic balancing machine having a control device for indexing a rotor according to the present invention.

Referring in more particularity to the drawing, FIG. 1 shows a dynamic balancing machine in which a rotor 1 to be examined for unbalance, such as a car wheel, brake drum, flywheel or the like, is mounted on the upper end of a spindle 2. Vibration, which occurs during the revolution of the rotor 1, is transmitted to a vibrating frame 3. In order that signals synchronized with the revolution of the spindle 2 may be produced by an encoder 4, a gear 11 splined to the spindle 2 is in meshing engagement with a gear 12 splined to the encoder 4. Although the gears 11 and 12 of this embodiment have the same number of teeth, the number of teeth of the gear 12 may be an integral multiple of the number of teeth of the gear 11.

A timing belt may be used in place of the gears. Alternatively, the encoder 4 may be directly mounted on the spindle 2.

A belt 5 extends around the spindle 2 and the motor pulley 6 of driving motor 7, which may be an AC servomotor, DC servomotor or step motor. Torque developed by the driving motor 7 for revolving the spindle 2 is transmitted to the spindle 2 through the motor pulley 6 and the belt 5. The vibration of the frame 3 is detected by vibration pickups 8. The vibrating frame 3 is held by springs 9 in such a manner that the vibrating frame 3 is adapted to vibrate. The numeral 10 identifies a base of the machine.

A sensor 13 for detecting the number of revolutions and outputting the revolution speed consists, e.g., of an encoder, resolver or tachometer generator, and is mounted on the end of the spindle 2 or the shaft of the driving motor 7 opposite to the end on which the belt transmission is mounted. If the sensor 13 consists of an encoder, an output taken from this encoder can be substituted for an output to be taken from the above-described encoder 4. Therefore, one can do without the encoder 4.

Figure 2:
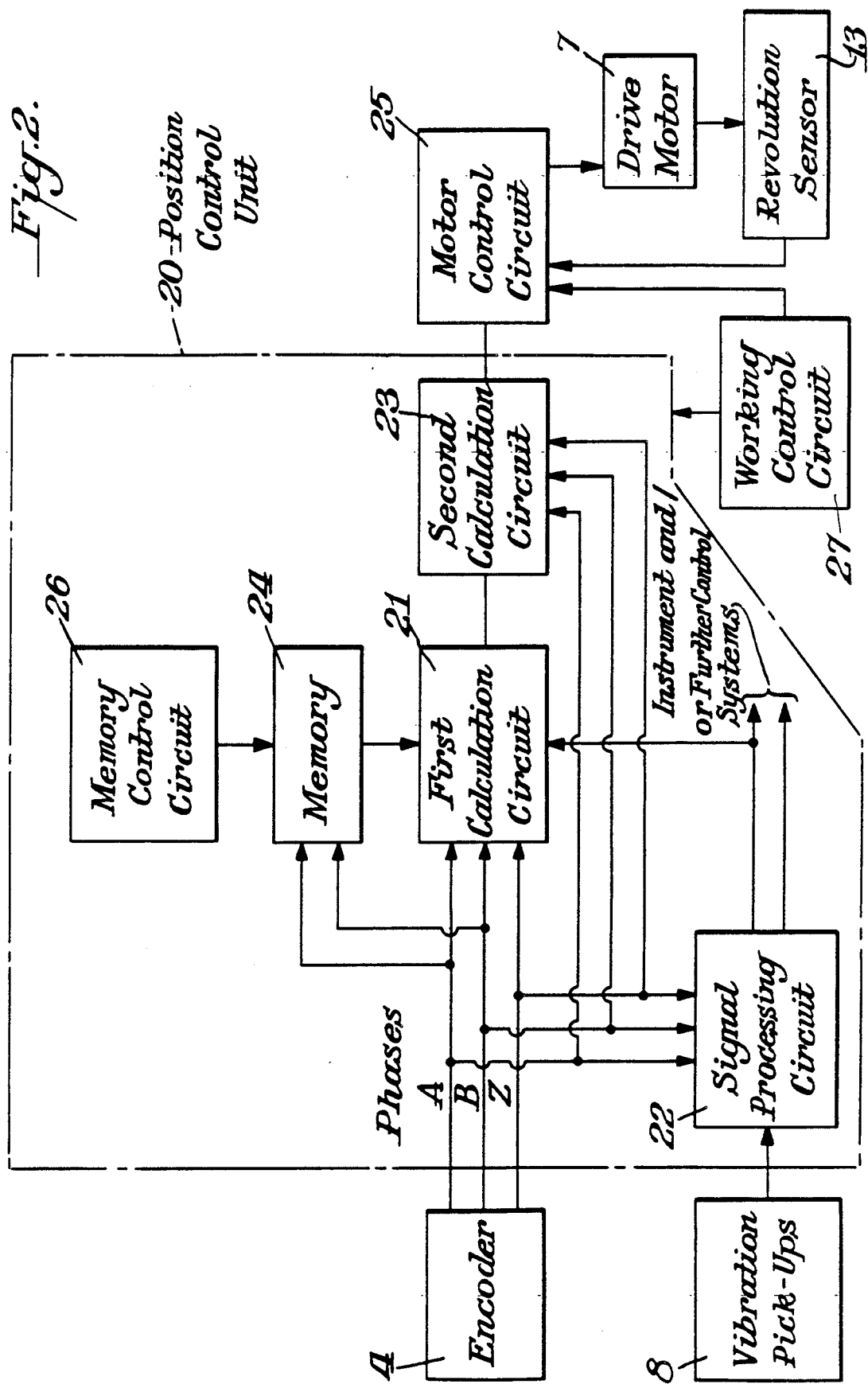
FIG. 2 is a block diagram of a control circuit for indexing a rotor on a balancing machine, according to the present invention.

The block diagram of FIG. 2 illustrates the control device included in the dynamic balancing machine shown in FIG. 1. The electrical circuit for this embodiment centers around a position control unit 20, in which prescribed arithmetic operations are performed on the basis of the various output signals taken from the encoder 4, vibration pickups 8 and the sensor 13. The output taken from the position control unit 20 is fed to the driving motor 7 through a motor control circuit 25.

In this embodiment, the position control unit 20 includes a first calculation circuit 21, a second calculation circuit 23, a memory 24, a memory control circuit 26 and a signal processing circuit 22. Reference will now be specifically made to how the position control unit 20 and the motor control circuit 25 work under the control of the working control circuit 27.

Incidentally, the position control unit 20 may consist of a microcomputer so that a sequential operation equivalent to the following description may proceed in accordance with a program.

The outputs taken from the vibration pickups 8 are fed to the signal processing circuit 22 by which signals representing the amount and angular position of unbalance are developed respectively and fed to measuring instruments, etc. For example, the signal representing the angular position of unbalance is fed to the first calculation circuit 21.

Figure 3:
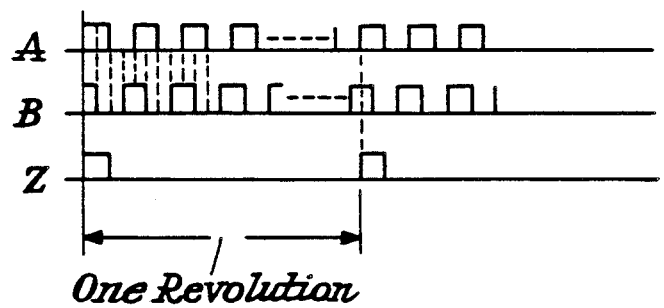
FIG. 3 is a waveform chart illustrating the output signals taken from an encoder, according to the present invention.

The output taken from the encoder 4, which is also fed to the first calculation circuit 21, consists of phases A, B and Z as shown in FIG. 3. Phases A and B consist of pulses, each of which is generated every time the spindle 2, hence the rotor 1, has rotated by a very small prescribed angle (e.g. 0.1°, 0.5° or 1°). The number of pulses generated during the time when the rotor 1 makes one revolution amounts to $P_e$. The pulses falling under phase A is slightly shifted with respect to the pulses falling under phase B so that the direction of rotation of the rotor 1 may be detected from the phase difference. Phase Z consists of a pulse generated every time the rotor 1 has made one revolution. The angular position in which this pulse is generated constitutes a datum point for the revolution of the rotor 1.

Figure 4:
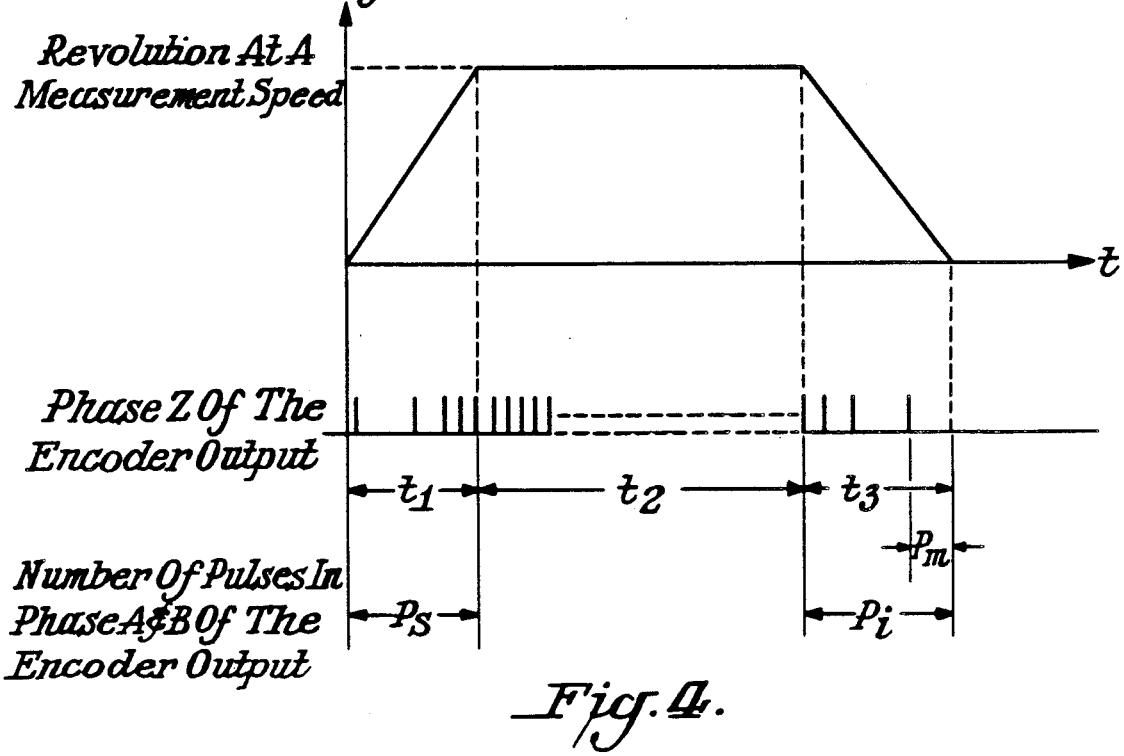
FIG. 4 is a schematic illustration explaining the timing of signals delivered to the control circuit shown in FIG. 2.

FIG. 4 is a waveform chart illustrating the operation of the control circuit shown in FIG. 2. Referring now to FIGS. 2 and 4, the rotor 1 is mounted on the upper end of the spindle 2 of a dynamic balancing machine for the purpose of detecting the unbalance of the rotor 1. The driving motor 7 is energized, and the rotor 1 is revolved at a prescribed measurement speed. The number of revolutions obtained during the rise time $t_1$ (i.e., in the time interval between the moment when the rotor 1 begins to revolve and the moment when the prescribed measurement speed is reached) approximately amounts to N by way of example. The number of pulses generated by the encoder 4 during this rise time amounts to $P_s$ in every two phases A and B. These pulses are stored in the memory 24.

The unbalance of the rotor 1 is detected by the vibration pickups 8 during the time when the rotor 1 is revolving at the prescribed measurement speed. The detection signal is processed in the signal processing circuit 22 so that signals representing the amount and angular position of unbalance may be obtained.

A calculation is carried out in the first calculation circuit 21 during the time when the rotor 1 is revolving at the measurement speed. The aim of this calculation is to calculate the number ($P_a$) of pulses generated in the time interval between the moment when a reference pulse is outputted in phase Z and the moment when the angular position of unbalance of the rotor 1 is detected by the vibration pickups 8 and the signal processing circuit 22. The calculation is carried out on the basis of a signal developed by the signal processing circuit 22 as one representing the angular position of unbalance on one hand, and on the basis of pulses generated by the encoder 4 and falling respectively under phases A, B and Z on the other hand. The number (K) of pulses is added to the result of this calculation. The number K is a constant corresponding to an angular distance by which the position where the pulse Z is generated by the encoder 4 and the position where a correction station (not shown) is fixedly placed are circumferentially spaced around the axis of revolution of the rotor 1. The number ($P_m$) of revolution signals, which is given by $P_m = P_a + K$, represents an angle of revolution by which the rotor 1 has to be revolved in order to allow the angular position of unbalance of the rotor 1 to agree with the position where the correction station is fixedly placed. The number ($P_m$) of revolution signals is fed to the second calculation circuit 23.

Various methods are available for determining the number ($P_b$) of revolution signals required for effecting the brake action. One of these methods takes advantage of the facts that the mechanical construction of the dynamic balancing machine allows the driving motor 7 to be under a constant load and that, consequently, the number ($P_b$) of revolution signals in phases A and B outputted from the encoder 4 during the minimum fall time $t_b$ for stopping the rotor 1 is equal to the number ($P_s$) of revolution signals outputted during the rise time $t_1$. In this method, therefore, the number $P_s$ detected during the rise time $t_1$ is stored in the memory 24, because the number $P_s$ is deemed to be the number $P_b$ required for braking the rotor 1 to a stop.

A significant feature of another method, on which the present invention is based, is predicated on a dummy run which is carried out in place of counting the number ($P_s$) of revolution signals outputted during the rise time $t_1$ and deeming this number to be the number ($P_b$) required for braking the rotor 1 to a stop. The aim of this dummy run is to count the number ($P_b$) per se of revolution signals outputted from the encoder 4 in a time interval between the moment when the revolution speed of the rotor 1 begins to decrease from the measurement speed and the moment when the revolution of the rotor 1 is stopped. In this method, therefore, the number $P_b$ is stored in the memory 24.

The second calculation circuit 23 performs the following operations on the basis of the number ($P_b$) of revolution signals stored in the memory 24, the number ($P_m$) of revolution signals developed by the first calculation circuit 21 as the ones representing the angular position of unbalance, and the number ($P_e$) of revolution signals developed during the time when the rotor 1 makes one revolution:

$$Pi = Pm + Pe \times n \geqq Pb$$

where n = integral number of revolutions of the rotor 1 to be determined in the second calculation circuit 23 so as to minimize the value of Pi.

If the rotor 1 revolving at a measurement speed is to be stopped in the shortest time, the number of pulses to be generated by the encoder 4 during this minimum fall time should amount to $P_b$. The implication of the above inequality is that, since the aim of this embodiment is to stop the rotor 1 in such a manner that the angular position of unbalance of the rotor 1 agrees with a predetermined angular position in which the rotor 1 is to be stopped, the number ($P_i$) of revolution signals which is equal to or larger than $P_b$ has only to be used for braking the driving motor 7 to a stop.

Figure 5A:
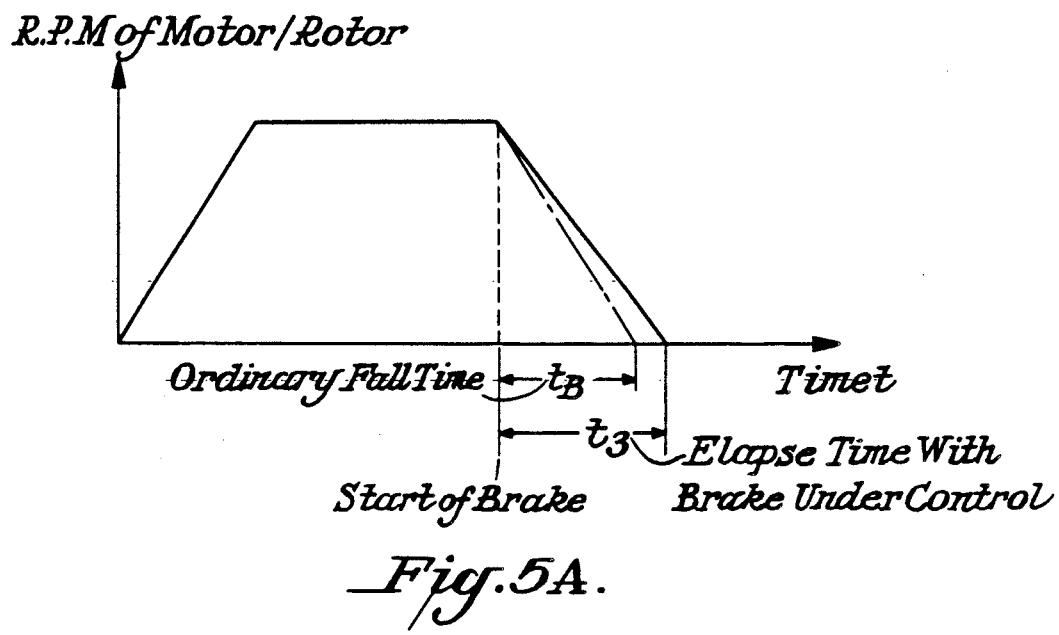
FIG. 5A is a graphic representation of how the revolution speed of a rotor to be examined for unbalance is allowed to vary with time according to one embodiment of the present invention.

FIG. 5A illustrates how the rotor 1 can be stopped in a desired angular position. The control over the rotor 1 is effected in such a manner that the brake action is started at the moment when a reference pulse is produced during the time when the rotor 1 is revolving at a measurement speed. The start on brake action is followed by an adjustment of damping force exerted on the driving motor 7. The revolution of the rotor 1 comes to a stop when the minimal number ($P_i$) of revolution signals is reached.

Figure 5B:
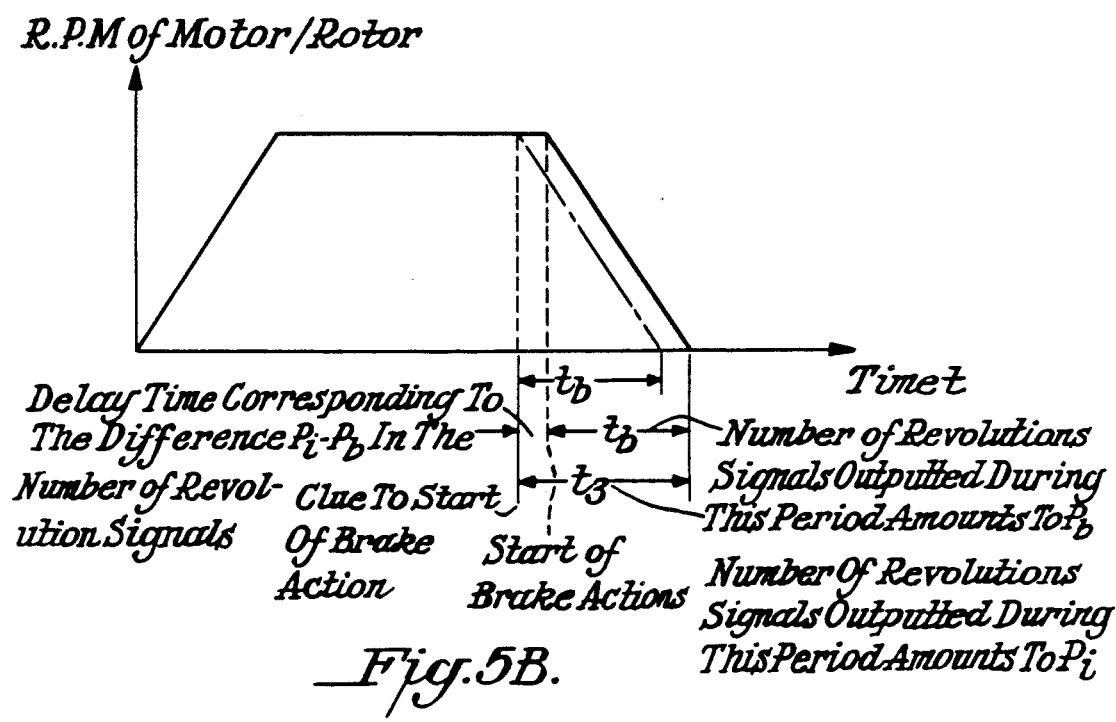
FIG. 5B is a graphic representation of how the revolution speed of a rotor is allowed to vary with time according to another embodiment of the present invention.

Alternatively, brake action may be effected in such a manner as shown in FIG. 5B. A significant feature of this method is predicated on delaying the timing of a start on brake action instead of adjusting the damping force to be exerted on the driving motor 7. The delay time should correspond to the time interval between a first moment when a reference pulse is produced during the time when the rotor 1 is revolving at a measurement speed and a second moment when the number of revolution signals developed after the first moment amounts to $P_i - P_b$. The revolution of the rotor 1 is stopped at a third moment when the number of revolution signals developed after the first moment amounts to $P_i$.

Figure 6:
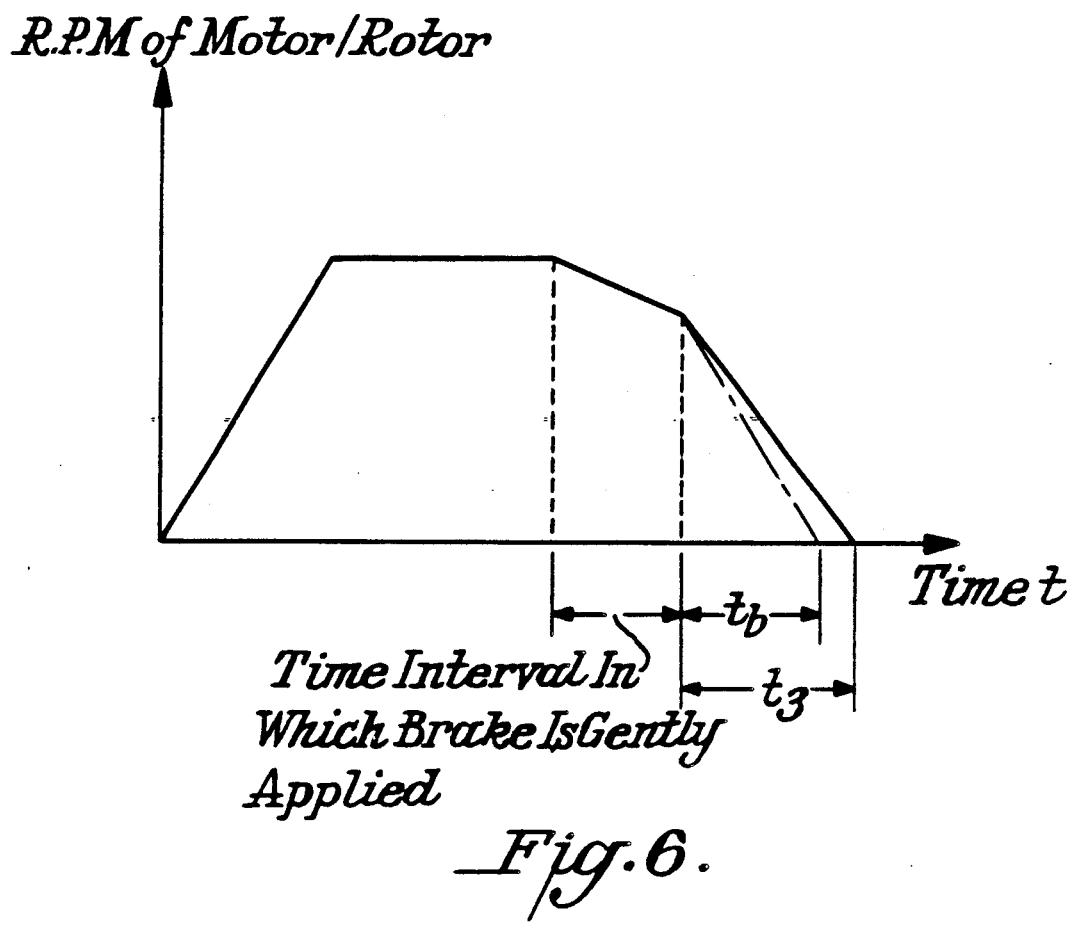
FIG. 6 is a graphic representation of how the revolution speed of a rotor is allowed to vary with time according to still another embodiment of the present invention.

Alternatively, stop control in accordance with the present invention can be effected in such a manner as shown in FIG. 6. In this case, there is a time interval in which the brake is gently applied. This gentle brake action is started at the moment when the measurement of unbalance is completed. A reference pulse is not detected until the revolution speed is decreased to some extent.

In any case, the rotor 1 can be accurately stopped in a short time and in such a manner that the angular position of unbalance of the rotor 1 is allowed to agree with a predetermined angular position in which the rotor 1 is to be stopped so that the unbalance of the rotor 1 may be corrected immediately after the stoppage of the rotor 1.

Although a vertical type dynamic balancing machine has been shown as an example in the above-described embodiments, the present invention can be used in a horizontal type dynamic balancing machine as well.

Figure 7:
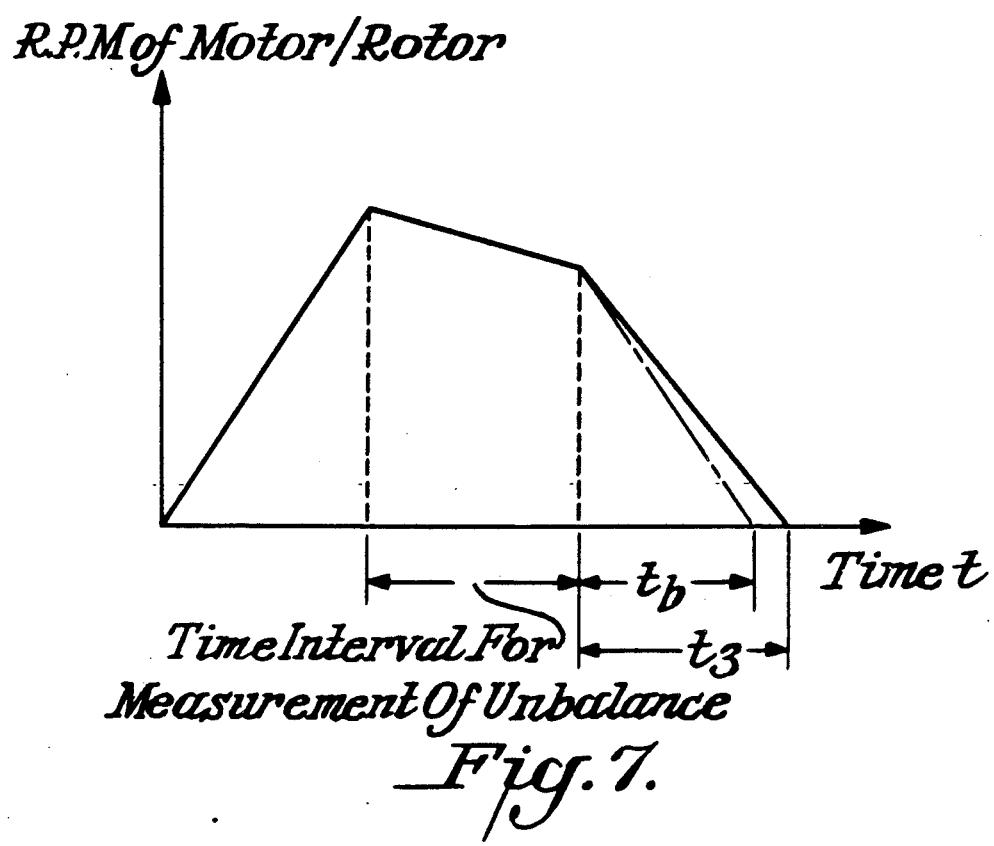
FIG. 7 is a graphic representation of how the revolution speed of a rotor is allowed to vary with time according to still another embodiment of the present invention.

In some of the dynamic balancing machines, unbalance is measured during acceleration or deceleration, as shown in FIG. 7. The present invention can be used in such machines as well, provided that the coverage of the present invention begins at the moment when the measurement of unbalance is completed.

The present invention can also be used for a belt-driven rotor 1 as well. However, there are some cases where, because of belt slippage which occurs when the brake is abruptly applied, the belt-driven rotor 1 is prevented from stopping exactly in a predetermined angular position. In order to stop the rotor 1 exactly and in the shortest time at the predetermined angular position, operation at a measurement speed should not be immediately followed by stop control, but be followed either by a free running time or by a time interval in which the brake is applied gently as is the case with the embodiment of FIG. 6.

Because of the above-described construction of the control device in accordance with the present invention, the rotor, which is revolving at a measuement speed, can be braked to a stop in a shortest time in a prescribed angular position.

What is claimed is:

1. A control device for indexing a rotor on a dynamic balancing machine in which the rotor is revolved at measurement speed and subjected to detection of unbalance including a determination of angular position of unbalance, the control device comprising:

reference signal generating means for producing a reference signal every time the rotor rotates 360°;

revolution signal generating means for producing a revolution signal every time the rotor rotates a very small prescribed angle;

memory means for storing the number ($P_b$) of revolution signals produced by the revolution signal generating means in a minimal time interval between the moment when the revolution speed of the rotor begins to decrease from measurement speed and the moment when the revolution of the rotor is stopped;

first calculating means in which an angular position of unbalance of the rotor is calculated in terms of the number ($P_m$) of revolution signals produced by the revolution signal generating means in the time interval between the moment when the reference signal is produced by the reference signal generating means and the moment when the angular position of unbalance is detected during the time when the rotor is revolved at measurement speed;

second calculating means in which arithmetic operations are performed to obtain the minimal number ($P_i$) of revolution signals necessary for allowing the angular position of unbalance of the rotor to agree with a predetermined angular position in which the revolution of the rotor is stopped, the arithmetic operations being performed on the basis of the number ($P_b$) of revolution signals stored in the memory means, the number ($P_m$) of revolution signals calculated in the first calculating means, and the number ($P_e$) of revolution signals produced during the time when the rotor rotates 360°; and braking means for allowing the revolution speed of the rotor to begin to decrease from measurement speed in response to a reference signal produced by the reference signal generating means when the minimal number ($P_i$) of revolution signals has been obtained in the second calculating means and for stopping the revolution of the rotor at the moment when the number of revolution signals produced by the revolution signal generating means agrees with the minimal number ($P_i$) of revolution signals.

2. A control device for indexing a rotor on a dynamic balancing machine in which the rotor is revolved at measurement speed and subjected to detection of unbalance including a determination of angular position of unbalance, the control device comprising:

reference signal generating means for producing a reference signal every time the rotor rotates 360°;

revolution signal generating means for producing a revolution signal every time the rotor rotates a very small prescribed angle;

memory means for storing the number ($P_b$) of revolution signals produced by the revolution signal generating means in a time interval between the moment when the revolution speed of the rotor begins to decrease from measurement speed and the moment when the rotor is braked to a stop;

first calculating means in which the angular position of unbalance of the rotor is calculated in terms of the number ($P_m$) of revolution signals produced by the revolution signal generating means in the time interval between the moment when the reference signal is produced by the reference signal generating means and the moment when the angular position of unbalance is detected during the time when the rotor is revolved at measurement speed;

second calculating means in which arithmetic operations are performed to obtain the minimal number ($P_i$) of revolution signals necessary for allowing the angular position of unbalance of the rotor to agree with a predetermined angular position in which the revolution of the rotor is stopped, the arithmetic operations being performed on the basis of the number ($P_b$) of revolution signals stored in the memory means, the number ($P_m$) of revolution signals calculated in the first calculating means, and the number ($P_e$) of revolution signals produced during the time when the rotor rotates 360°; and braking means for allowing the rotor to be delayed in beginning to undergo braking power with delay time corresponding to the time interval between the moment when a reference signal is produced by the reference signal generating means subsequently to the calculation of the minimal number ($P_i$) of revolution signals in the second calculating means and the moment when the number of revolution signals associated with the angular position of unbalance is attained and for stopping the revolution of the rotor at the moment when the number of revolution signals produced by the revolution signal generating means agrees with the minimal number ($P_i$) of revolution signals.

* * * * *